United States Patent [19]

Patel et al.

[11] Patent Number: 5,085,872
[45] Date of Patent: Feb. 4, 1992

[54] METHOD OF MANUFACTURING A CHEWING GUM BASE

[75] Inventors: Mansukh M. Patel, Downers Grove; Charles M. Copper, Willowbrook, both of Ill.

[73] Assignee: Wm. Wrigley Jr. Company, Chicago, Ill.

[21] Appl. No.: 568,462

[22] Filed: Aug. 16, 1990

[51] Int. Cl.$^5$ .............................................. A23G 3/30
[52] U.S. Cl. ........................................... 426/4; 426/6
[58] Field of Search ........................................ 426/3-6

[56] References Cited

U.S. PATENT DOCUMENTS

| | | | |
|---|---|---|---|
| 1,807,704 | 6/1931 | Pappadis | 426/4 |
| 3,984,574 | 10/1976 | Comollo | 426/4 |
| 4,352,823 | 10/1982 | Cherukuri et al. | 426/5 |
| 4,387,108 | 6/1983 | Koch et al. | 426/4 |
| 4,415,593 | 11/1983 | Glass et al. | 426/3 |
| 4,452,820 | 6/1984 | D'Amelia et al. | 426/4 |
| 4,518,615 | 5/1985 | Cherukuri et al. | 426/4 |
| 4,794,003 | 12/1988 | Cherukuri et al. | 426/4 |
| 4,808,418 | 2/1989 | Tena et al. | 426/5 |

FOREIGN PATENT DOCUMENTS

| | | |
|---|---|---|
| 0271445 | 6/1988 | European Pat. Off. |
| 55-19014 | 2/1980 | Japan . |
| 8806845 | 9/1988 | World Int. Prop. O. .............. 426/4 |

*Primary Examiner*—Jeanette Hunter
*Attorney, Agent, or Firm*—Ralph J. Gabric

[57] ABSTRACT

A method of manufacturing a chewing gum blend is disclosed wherein a high fat and oil gum base is cold blended with either a non-tack gum base or a conventional low fat fat gum base at temperatures between about 60° F. and 180° F.

17 Claims, No Drawings

METHOD OF MANUFACTURING A CHEWING GUM BASE

BACKGROUND OF THE INVENTION

The present invention is directed to a novel method of manufacturing a chewing gum and chewing gum base. The method comprises cold blending chewing gum base. In one embodiment of the present invention, a gum base having a high fat and oil content (hereinafter "HFO" gum base) is cold blended with a conventional low fat gum base. In another embodiment of the present invention, a HFO gum base is cold blended with a non-tack gum base. The present invention is further directed to a method of manufacturing a chewing gum wherein, in addition to cold blending the gum base, other chewing gum ingredients are mixed with the gum base. When used in chewing gum, the gum base manufactured according to the method of the present invention imparts improved texture, stability and flavor to chewing gum utilizing HFO base.

Chewing gums having a HFO base manifest non-tack properties. See, for example, U.S. Pat. No. 3,984,574. However, the texture, stability and flavor of chewing gums incorporating HFO gum base is somewhat less desirable than chewing gums incorporating conventional low fat gum base. Clearly, if a method of manufacturing a chewing gum were developed wherein the chewing gum exhibited the non-tack properties of chewing gums having HFO base, as well as the texture, stability and flavor characterized by gums incorporating conventional low fat bases, it would experience great commercial success.

SUMMARY OF THE PRESENT INVENTION

It has been discovered that cold blending HFO gum base according to the method of the present invention results in a gum base blend which imparts improved texture, stability and flavor to chewing gum. In one embodiment of the present invention, HFO gum base is cold blended with conventional low fat gum base to yield a gum base blend which imparts to chewing gum improved texture, stability and flavor. In another embodiment of the present invention, HFO gum base is cold-blended with non-tack gum base which, when used in chewing gum, results in a chewing gum having improved texture, stability and flavor, as well as non-tack properties. In particular, according to one embodiment of the present invention, HFO gum base and conventional low fat gum base are mixed at a temperature of about 60° F. to about 180° F. In another embodiment of the present invention, HFO gum base and non-tack gum base are mixed at a temperature of about 60° F. to about 180° F. In another embodiment of the present invention, chewing gum ingredients are mixed with cold blended HFO gum base and conventional low fat gum base to yield a chewing gum with improved texture, stability, flavor. In yet another embodiment of the present invention, chewing gum ingredients are mixed with cold blended HFO gum base and non-tack gum base to yield a chewing gum having non-tack properties, and having improved texture, stability and flavor.

DETAILED DESCRIPTION OF THE PREFERRED EMBODIMENTS

In general, a chewing gum comprises a water soluble bulk portion, a water insoluble chewable gum base portion, and, typically, water insoluble flavors. The water soluble bulk portion dissipates with a portion of the flavor over a period of time during chewing. The chewable gum base portion is retained in the mouth throughout the chew. The present invention is primarily directed to the chewable gum base portion of the chewing gum.

In accordance with the present invention, a method of manufacturing a superior gum base which imparts to chewing gum improved texture, stability and flavor has been discovered. In one embodiment of the present invention, HFO gum base is cold blended with conventional low fat gum base. By cold blended it is meant that HFO gum base and conventional low fat gum base are mixed at specific temperatures. In particular, the gum bases are mixed at a temperature of between about 60° F. and 180° F. at one atmosphere of pressure. Without being restricted thereto, it is theorized that fat and oil in the HFO gum base experiences heat degradation at temperatures substantially above the aforesaid range and, thus, the resulting gum base blend, when used in chewing gum, imparts to the gum a shortened shelf-life as well as a rancid taste. Conversely, when exposed to temperatures substantially below the aforementioned range, the HFO gum base is for all practical purposes not soft enough for mixing with conventional low fat gum base. Preferably, HFO gum base and conventional low fat gum base are mixed at a temperature of between about 80° F. and about 170° F. Most preferably, the HFO and conventional gum bases are mixed at a temperature of between about 120° F. and about 160° F.

As contemplated by the present invention, HFO gum base is defined to be a gum base having from about 20% to about 50% by weight fat and/or oil. A HFO gum base generally comprises filler in an amount from about 5% to about 30% and preferably from about 10% to about 20% by weight of the HFO base; low molecular weight polyvinyl/acetate (i.e. molecular weight of about 8,000 to about 60,000) from about 10% to about 40% by weight of the HFO base; elastomers in an amount from about 20% to about 40% by weight of the HFO base; fat and/or oil from about 20% to about 50% by weight of the HFO base; and emulsifiers from about 1% to about 10% by weight of the HFO base.

The fillers contemplated by the present invention include calcium carbonate, magnesium carbonate, talc, tricalcium phosphate and the like, as well as mixtures thereof. Elastomers contemplated for use in the HFO gum base include synthetic gums or synthetic elastomers. Illustrative synthetic elastomers are butadiene-styrene copolymers, polyisobutylene, and isobutylene-isoprene copolymer. Preferably, polyisobutylene, isobutylene-isoprene copolymer, or mixtures thereof are employed. Most preferably, the HFO gum base utilizes a mixture of isobutylene-isoprene copolymer and polyisobutylene wherein the ratio of isobutylene-isoprene copolymer to polyisobutylene is from about 3:1 to about 1:3 by weight. Fats and oils contemplated for use in the HFO gum base include but are not limited to hydrogenated vegetable oil, hydrogenated cottonseed oil, hydrogenated soybean oil and the like or mixtures thereof. Emulsifiers contemplated for use in the HFO gum base include glyceryl monostearate, lecithin, fatty acid monoglycerides, diglycerides, triglycerides, an the like, as well as mixtures thereof. Glyceryl monostearate is a particularly preferred emulsifier for use in the HFO base. Optionally, the HFO gum base may contain antioxidant. Suitable antioxidants include butylhydroxide anisole (BHA) and butylhydroxide toluene (BHT).

The preferred HFO gum base contemplated for use in the present invention comprises an antioxidant such as BHA from about 0.01% to about 0.1% by weight, and most preferably from about 0.02% to about 0.05% by weight of the HFO gum base; hydrogenated cottonseed oil in an amount from about 5% to about 20%, and most preferably from about 10% to about 15% by weight of the HFO gum base; hydrogenated vegetable oil in an amount from about 5% to about 20%, and most preferably from about 6% to about 15% by weight of the HFO gum base; hydrogenated soybean oil in an amount from about 5% to about 20%, and most preferably from about 10% to about 15% by weight of the HFO gum base; glycerol monostearate in an amount from about 0.1% to about 10%, and most preferably from about 1% to about 5% by weight of the HFO gum base; low molecular weight polyvinyl acetate in an amount from about 10% to about 40%, and most preferably from about 20% to about 30% by weight of the HFO gum base; calcium carbonate in an amount from about 5% to about 30%, and most preferably from about 10% to about 20% by weight of the HFO gum base; polyisobutylene in an amount from about 5% to about 30%, and most preferably from about 10% to about 30% by weight of the HFO gum base; and isoprene-isobutylene copolymer in an amount from about 5% to about 30%, and most preferably from about 5% to about 15% by weight of the HFO gum base.

In one embodiment of the present invention any and all conventional low fat gum bases known by those skilled in the art are contemplated for cold blending with HFO base. Conventional low fat gum bases typically comprise elastomers, resins, fats and oils, waxes, softeners, and inorganic fillers.

Elastomers may include polyisobutylene, isobutylene-isoprene copolymer, and styrene butadiene rubber, as well as natural latexes such as chicle and natural gums. Elastomers generally comprise from about 15% to about 50% by weight of the conventional low fat gum base. Preferably, elastomers are employed in an amount from about 20% to about 40% by weight of the conventional lowfat base. Resins may include polyvinylacetate, terpene resins, and elastomer solvents such as ester gums and rosin esters. Resins and elastomer solvents generally comprise from about 10% to about 50% by weight of the conventional low fat gum base. Fats and oils may also be included in the conventional low fat gum base, including tallow, hydrogenated and partially hydrogenated vegetable oils, and cocoa butter. Conventional low fat gum bases generally comprise from about 1% to about 15% by weight fats and oils. Waxes may include candellila, paraffin, microcrystalline, and natural waxes such as beeswax and carnauba. Waxes contemplated for use in conventional low fat gum base include both those with high melting points of about 70° C. or greater and low melting points of about 30° C. to about 70° C. Waxes generally comprise from about 1% to about 15% by weight of the conventional low fat gum base. Conventional low fat gum bases may also include filler components such as calcium carbonate, magnesium carbonate, talc, dicalcium phosphate or the like. Fillers generally comprise from about 5% to about 50% by weight of the conventional low fat gum base. Conventional low fat gum bases typically also contain softeners, including glycerol monostearate and glycerol triacetate. Further, conventional low fat gum base may optionally contain ingredients such as antioxidants, colors, and emulsifiers. Suitable antioxidants include BHA, BHT and the like. Emulsifiers include glycerol monostearate, lecithin, fatty acid monoglycerides, diglycerides, triglycerides and the like.

In another embodiment of the present invention, HFO gum base is cold blended with a non-tack gum base. Any and all non-tack chewing gum bases known by those skilled in the art are contemplated for cold blending with HFO gum base. Non-tack gum bases typically comprise waxes such as paraffin and microcrystalline; terpene resins; oils such as hydrogenated cottonseed, hydrogenated soybean oil, and hydrogenated vegetable oil; glycerol monostearate; low molecular weight polyvinyl acetate; inorganic fillers such as calcium carbonate, magnesium carbonate, talc, dicalcium phosphate, and the like; lecithin; polyisobutylene; and isoprene-isobutylene copolymer.

Preferably, the non-tack gum base contemplated for use in the present invention comprises a high and a low melting wax. By high melting wax it is meant a wax with a melting point of about 70° C. or greater. High melting waxes include candelilla wax, paraffin wax, carnauba wax, microcrystalline wax, and the like. By low melting point wax it is meant a wax with a melting point of about 50° C. or less. A preferred low melting wax for use in the present invention is a low melting paraffin wax (m.p. about 46° C.) available from Boler Petroleum Co. under the name "1397 wax". The preferred non-tack gum base contemplated for use in the present invention comprises microcrystalline wax having a melting point of about 82° C. in an amount from about 1% to about 20%, and most preferably from about 4% to about 15% by weight of the non-tack base; terpene resin having a melting point of about 85° C. in an amount of up to about 40%, and most preferably between about 15% and about 30% by weight of the non-tack base; paraffin wax having a melting point of about 46° C. in an amount of up to about 4%, and most preferably between about 1% and about 2% by weight of the non-tack base; hydrogenated cottonseed, hydrogenated soybean, and/or hydrogenated vegetable oil in an amount from about 1% to about 15%, and most preferably from about 2% to about 10% by weight of the non-tack base; glycerol monostearate in an amount from about 0.1% to about 10%, and most preferably from about 3% to about 7% by weight of the non-tack base; low molecular weight polyvinyl acetate in an amount up to about 40% by weight, and most preferably between about 20% and 30% by weight of the non-tack base; inorganic filler in an amount from about 0.5% to about 50%, and most preferably from about 10% to about 15% by weight of the non-tack base; lecithin in an amount up to about 5%, and most preferably between about 1% and 2% by weight of the non-tack base; polyisobutylene in an amount up to about 20% and most preferably between about 2% and about 15% by weight of the non-tack base; and isoprene-isobutylene copolymer in an amount up to about 20%, and most preferably from about 2% to about 15% by weight of the non-tack base.

In addition to base, chewing gum further comprises other ingredients. A chewing gum contains a water-soluble bulk portion. The water-soluble bulk portion may comprise softeners, sweeteners, flavoring agents and combinations thereof. Softeners are added to the chewing gum in order to optimize the chewability and mouth feel of the gum. Softeners, also known in the art as plasticizers or plasticizing agents, generally comprise between about 0.5% to about 15.0% by weight of the chewing gum. Softeners contemplated by the present invention include glycerin, lecithin, and combinations thereof. Furthermore, aqueous sweetener solutions such as those containing sorbitol, hydrogenated starch hydrosylates, corn syrup, and combinations thereof may be used as softeners and binding agents in gum.

The method of the present invention is contemplated for use in the manufacture of either sugar-containing or sugarless gum formulations. Sugar sweeteners generally include saccharide containing components commonly known in the chewing gum art which comprise, but are not limited to, sucrose, dextrose, maltose, dextrin, dried invert sugar, fructose, levulose, galactose, corn syrup solids and the like, alone or in any combination. Sugarless sweeteners generally include components with sweetening characteristics, but which are devoid of the commonly known sugars and comprise, but are not limited to, sugar alcohols such as sorbitol, mannitol, xylitol, hydrogenated starch hydrosylates, maltitol and the like, alone or in any combination. Additionally, high potency sweeteners may be utilized in sugar-containing, as well as sugarless gum formulations.

A flavoring agent may be present in the chewing gum in an amount from about 0.1% to about 10% by weight, and preferably from about 0.5% to about 3% by weight of the chewing gum. Flavoring agents may comprise essential oils, synthetic oils, or mixtures thereof including, but not limited to, oils derived from plants and fruits such as citrus oils, fruit essences, peppermint oil, spearmint oil, clove oil, oil of wintergreen, anise, and the like. Artificial flavoring components may also be used in chewing gums. Those skilled in the art will recognize that natural and artificial flavoring agents may be combined in any reasonably acceptable blend. All such flavors and flavor blends are contemplated by the present invention.

Optional ingredients such as colors, emulsifiers and pharmaceutical agents may be added to the chewing gum as well.

According to one embodiment of the present invention, HFO gum base and conventional low fat gum base will be cold blended in such amounts so that the resulting gum base blend comprises from about 2% to about 50% by weight HFO gum base. Preferably, the resulting chewing gum base blend will comprise from about 5% to about 40% by weight HFO gum base. Most preferably, the resulting gum base blend will comprise from about 10% to about 30% by weight HFO gum base.

In another embodiment of the present invention, HFO gum base and non-tack gum base are cold blended in such amounts so that the resulting gum base blend comprises from about 2% to about 50% by weight HFO gum base. Preferably, the resulting chewing gum base blend will comprise from about 5% to about 40% by weight HFO gum base. Most preferably, the resulting chewing gum base blend will comprise from about 10% to about 30% by weight HFO gum base.

The HFO gum base and either the non-tack or conventional low fat gum base, depending on the base one desires to use, may be blended according to any method known by those skilled in the art, provided the blending occurs at temperatures between about 80° F. and about 170° F. In the preferred embodiment, however, either non-tack or conventional low fat gum base having a temperature of about 200°-250° F. is added to a running mixer. The HFO base, maintained at room temperature (about 70°-90° F.) is then mixed with the molten non-tack or conventional low fat base causing the temperature of the resulting base blend to drop to about 140°-160° F. within two minutes. The base blend comprising HFO base and either non-tack base or conventional low fat base is subject to continued mixing for a period of from about 2 to about 10 minutes. Colors, emulsifiers, glycerin, and a portion of the bulking agent is then added to the base blend. Further portions of the bulking agent are added, and flavor added with the final portion. This mixing procedure takes about 7 to 17 minutes, but may take longer as those skilled in the art will recognize. Furthermore, those skilled in the art will recognize that variations to the abovedescribed procedure may be followed. It is to be understood that an equivalent of changes and modifications of the embodiments described above are also contemplated by the present invention. The following examples are not to be construed as a limitation upon the present invention, but are included merely as an illustration of various embodiments.

EXAMPLES

Example 1

A chewing gum having the formulation provided below was prepared by presoftening both the HFO base and the non-tack base at about 140° F.

| | |
|---|---|
| Non-tack Base[1] | 17.9% |
| HFO Base[2] | 4.4% |
| Calcium Carbonate | 2.0% |
| Dextrose Monohydrate | 13.4% |
| 43 Baume Syrup | 5.1% |
| Glycerin | 2.0% |
| Aspartame | 0.1% |
| Peppermint Flavor | 1.3% |
| Sugar | 53.8% |
| | 100.0% |

[1] The non-tack base had the following formulation: Microcrystalline wax (82° C. melting point) (11.4%); Terpene Resin (85° C. melting point) (25.8%); Paraffin wax (46° C. melting point) (1.0%); Hydrogenated cottonseed oil (3.2%); Glycerol Monostearate (4.7%); low molecular weight polyvinyl acetate (27.4%); calcium carbonate (12.4%); Lecithin (1.5%); Polyisobutylene (2.3%) and Isoprene-Isobutylene copolymer (10.3%).
[2] The HFO base had the following formulation: BHA (0.04%); Hydrogenated cottonseed oil (13.3%); Hydrogenated vegetable oil (9.9%); Hydrogenated soybean oil (13.3%); Glycerol monostearate (2.7%); Low molecular weight polyvinyl acetate (21.7%); Calcium carbonate (13.26%); Polyisobutylene (15.9%); and Isoprene-Isobutylene copolymer (9.9%).

Upon presoftening, the two bases were blended in a lab scale mixer for about 2 minutes at a temperature of about 140° F. Whereupon, the remaining chewing gum ingredients were added and mixed for a period of about 11 minutes. The resulting chewing gum had good quality texture and clean flavor. Another chewing gum having the formulation provided above can be prepared by presoftening both the HFO base and the non-tack base at about 250° F. Upon presoftening, the two bases can then be blended in a lab scale mixer for about 2 minutes at a temperature of about 250° F. Whereupon the remaining chewing gum ingredients can be added and mixed for a period of about 11 minutes. The resulting chewing gum will manifest a strong rancid, oily off-taste, which is likely attributable to the heat degradation of the HFO base.

Example 2

Chewing gum A having the formulation provided below was prepared.

| | |
|---|---|
| Non-tack Base | 16.8% |
| HFO Base | 5.5% |
| Calcium Carbonate | 2.0% |
| Dextrose Monohydrate | 13.4% |
| 43 Baume Syrup | 5.1% |
| Glycerin | 2.0% |
| Spearmint Flavor | 1.3% |
| Sugar | 53.9% |
| | 100.0% |

The non-tack base and HFO base formulations as used in Example I were used in this Example as well. The non-tack gum base was added to the mixer in molten form --i.e. at a temperature of about 240° F. The HFO gum base, having a temperature of about 68° F. was then added to the mixer along with calcium carbonate. The temperature of the resulting base blend quickly equilibrated to a temperature of about 160° F. The blend of HFO base, non-tack gum base, and calcium carbonate was then mixed for about 2.5 minutes. The syrup, glycerin and first portions of sugar and dextrose monohydrate were then added to the base blend. With the addition of the second and final portion of the sugar, the flavor was added. The batch mix time was about 9 minutes.

Chewing gum B was prepared by presoftening both the HFO base and the non-tack base at about 240° F. Upon presoftening, the two bases were mixed in a pilot plant scale mixer for about 1 minute at a temperature of about 240° F. Calcium carbonate was then added and mixed for about 2 minutes. The syrup, glycerin and first portions of sugar and dextrose monohydrate were then added to the base blend. With the final portion of the sugar, flavor was added. The batch mix time was about 9 minutes.

Sensory evaluation comparing chewing gums A and B showed that gum A had clean, fresh, mint flavor whereas chewing gum B had a strong rancid, oily aftertaste, likely attributable to the heat degradation of the HFO base.

Example 3

A chewing gum having the formulation provided below was prepared:

| | |
|---|---|
| Non-Tack Base[1] | 16.8% |
| HFO Base | 5.5% |
| Calcium Carbonate | 2.0% |
| Dextrose Monohydrate | 13.4% |
| 43 Baume Syrup | 5.1% |
| Glycerin | 2.0% |
| Spearmint Flavor | 1.3% |
| Sugar | 53.9% |
| | 100.0% |

[1]The same non-tack base as used in previous Examples was used in this Example as well.

The HFO base used in this Example had the same formulation as in Examples 2 and 3, however, the batch used in this Example was older than in the previous examples. In fact, the HFO base used in this Example had started to manifest signs of deterioration. The non-tack base having a temperature of about 240° F. was added to the mixer. The HFO base and calcium carbonate having a temperature of about 68° F. were then added to the mixer; the resulting blend was mixed for about 2 to about 5 minutes at a temperature of about 160° F. The syrup, glycerin and first portions of the sugar and dextrose monohydrate were added. With the second and final addition of the sugar and dextrose monohydrate, the flavor was added. The batch mix time was about 9 minutes. The resulting chewing gum had good texture and clean, non-rancid flavor. Thus, even an aged batch of HFO base beginning to manifest signs of deterioration can be used to yield an organoleptic acceptable chewing gum when the gum is made according to the method of the present invention.

We claim:

1. A method of manufacturing a chewing gum base blend comprising the following steps:
   providing conventional low fat gum base comprising elastomer; resins; wax; filler; and from about 1% to about 15% by weight of a component selected from the group consisting of fat, oil, and mixtures thereof;
   providing HFO gum base comprising filler; low molecular weight polyvinyl acetate; elastomer; emulsifier and from about 20% to about 50% by weight of a component selected from the group consisting of fat, oil and mixtures thereof; and
   mixing conventional low fat gum base and HFO gum base at a temperature of from about 60° F. to about 180° F., and in such amounts so that the resulting chewing gum base blend comprises from about 2% to about 50% by weight HFO gum base.

2. The method of claim 1 wherein the chewing gum base blend comprises from about 5% to about 40% by weight HFO gum base.

3. The method of claim 1 wherein the chewing gum base blend comprises from about 10% to about 30% by weight HFO gum base.

4. The method of claim 1 wherein the conventional low fat gum base and HFO gum base are mixed at a temperature of from about 80° F. to about 170° F.

5. The method of claim 1 wherein the conventional low fat gum base and HFO gum base are mixed at a temperature of from about 120° F. to about 160° F.

6. The method of claim 5 wherein the elastomer of the HFO gum base comprises a mixture of isobutyleneisoprene copolymer and polyisobutylene wherein the ratio of isobutylene-isoprene copolymer to polyisobutylene is from about 3:1 to about 1:3 by weight.

7. The chewing gum base made by the method of claim 1.

8. A method of manufacturing a chewing gum comprising the following steps:
   providing conventional low fat gum base comprising elastomer; resins; wax; filler; and from about 1% to about 15% by weight of a component selected from the group consisting of fat, oil and mixtures thereof;
   providing HFO gum base comprising filler; low molecular weight polyvinyl acetate; elastomer; emulsifier; and from about 20% to about 50% by weight of at least one component selected from the group consisting of fat, oil and mixtures thereof;
   providing softener, sweetener and flavoring agent; and
   mixing conventional low fat gum base, HFO gum base, softener, sweetener and flavoring agent at a temperature of from about 60° F. to about 180° F. and in such amounts so that the resulting chewing gum comprises from about 2% to about 50% by weight HFO gum base.

9. The chewing gum made by the method of claim 8.

10. A method of manufacturing a chewing gum base blend comprising the following steps:
   providing non-tack gum base comprising high melting wax; terpene resin; low melting wax; oil; low molecular weight polyvinyl acetate; inorganic filler; lecithin; polyisobutylene; and isoprene-isobutylene copolymer;
   providing HFO gum base comprising filler; low molecular weight polyvinyl acetate; elastomer; emulsifier; and from about 20% to about 50% by weight of a component selected from the group consisting of fat, oil and mixtures thereof; and
   mixing non-tack gum base and HFO gum base at a temperature of from about 60° F. to about 180° F., and in such amounts so that the resulting chewing gum base blend comprises from about 2% to about 50% by weight HFO gum base.

11. The method of claim 10 wherein the chewing gum base blend comprises from about 5% to about 40% by weight HFO gum base.

12. The method of claim 10 wherein the chewing gum base blend comprises from about 10% to about 30% by weight HFO gum base.

13. The method of claim 10 wherein the non-tack gum base and conventional low fat gum base are mixed at a temperature of from about 80° F. to about 170° F.

14. The method of claim 10 wherein the non-tack gum base and conventional low fat gum base are mixed at a temperature of from about 120° F. to about 160° F.

15. The chewing gum base made by the method of claim 10.

16. A method of manufacturing a chewing gum comprising the following steps:
   providing non-tack gum base comprising high melting wax; terpene resin; low melting wax; oil; low molecular weight polyvinyl acetate; inorganic filler; lecithin; polyisobutylene; and isoprene-isobutylene copolymer;
   providing HFO gum base comprising filler; low molecular weight polyvinyl acetate; elastomer; emulsifier; and from about 20% to about 50% by weight of a component selected from the group consisting of fat, oil and mixtures thereof;
   providing softener, sweetener, and flavoring agent; and
   mixing non-tack gum base, HFO gum base softener, sweetener, and flavoring agent at a temperature of from about 60° F. to about 180° F. and in such amounts so that the resulting chewing gum comprises from about 2% to about 50% by weight HFO gum base.

17. The chewing gum made by the method of claim 16.

* * * * *

UNITED STATES PATENT AND TRADEMARK OFFICE
CERTIFICATE OF CORRECTION

PATENT NO. : 5,085,872

DATED : February 4, 1992

INVENTOR(S) : Mansukh M. Patel et al.

It is certified that error appears in the above-identified patent and that said Letters Patent is hereby corrected as shown below:

On the title page: Item [56] after "Attorney, Agent, or Firm", delete "Ralph J. Gabric" and substitute therefor --Willian Brinks Olds Hofer Gilson & Lione--.

In column 2, line 65, after "triglycerides," delete "an" and substitute therefor --and--.

In column 6, line 15, delete "abovedescribed" and substitute therefor --above-described--.

IN THE CLAIMS

In claim 6, line 3, delete "isobutyleneisoprene" and substitute therefor --isobutylene-isoprene--.

UNITED STATES PATENT AND TRADEMARK OFFICE
CERTIFICATE OF CORRECTION

PATENT NO. : 5,085,872

DATED : February 4, 1992

INVENTOR(S) : Mansukh M. Patel et al.

It is certified that error appears in the above-identified patent and that said Letters Patent is hereby corrected as shown below:

Column 10,

In claim 16, line 15, after the second occurrence of "gum base", insert --,--.

Signed and Sealed this

Twenty-second Day of March, 1994

*Attest:*

BRUCE LEHMAN

*Attesting Officer*     Commissioner of Patents and Trademarks